United States Patent [19]
Shishido

[11] Patent Number: 5,668,664
[45] Date of Patent: Sep. 16, 1997

[54] COLOR SEPARATION PRISM ASSEMBLY FOR C-MOUNT CAMERA

[75] Inventor: Takayasu Shishido, Tokyo, Japan

[73] Assignee: Asahi Seimitsu Kabushiki Kaisha, Tokyo, Japan

[21] Appl. No.: 653,391

[22] Filed: May 24, 1996

[30] Foreign Application Priority Data

Jun. 14, 1995 [JP] Japan ................................. 7-147586
Jan. 17, 1996 [JP] Japan ................................. 8-005860

[51] Int. Cl.$^6$ ............................................. G02B 27/14
[52] U.S. Cl. ............................................. 359/634
[58] Field of Search ............................ 359/634, 583, 359/834

[56] References Cited

U.S. PATENT DOCUMENTS

| | | | |
|---|---|---|---|
| 3,659,918 | 5/1972 | Tan | 359/589 |
| 4,236,177 | 11/1980 | Ohshima et al. | 358/55 |
| 4,262,305 | 4/1981 | Sekiguchi et al. | 358/55 |
| 4,268,119 | 5/1981 | Hartmann | 359/634 |
| 4,270,140 | 5/1981 | Ohishi | 358/55 |
| 4,589,015 | 5/1986 | Nakata | 358/55 |
| 5,251,068 | 10/1993 | Oshima | 359/634 |

FOREIGN PATENT DOCUMENTS

| | | |
|---|---|---|
| 0034812 | 9/1981 | European Pat. Off. . |
| 2078935 | 1/1982 | United Kingdom . |
| 2148026 | 5/1985 | United Kingdom . |

Primary Examiner—Georgia V. Epps
Assistant Examiner—Ricky Mack
Attorney, Agent, or Firm—Greenblum & Bernstein P.L.C.

[57] ABSTRACT

A color separation prism assembly includes an imaging lens, a blue light separation prism, a red light separation prism and a green light transmission prism, arranged in this order behind the imaging lens. A blue light reflecting dichroic layer is located between the blue light separation prism and the red light separation prism. A red light reflecting dichroic layer is located between the red light separation prism and the green light transmission prism. The prism assembly satisfies the relationships defined by $$20° < \alpha < 22°;$$

and $$35° < \beta < 37°,$$

wherein $\alpha$ represents an angle defined between a light incident surface of the blue light separation prism, perpendicular to an optical axis of the imaging lens and the blue light reflecting dichroic layer, and $\beta$ represents an angle defined between a light incident surface of the red light separation prism, parallel to the blue light reflecting dichroic layer and the red light reflecting dichroic layer.

2 Claims, 1 Drawing Sheet

COLOR SEPARATION PRISM ASSEMBLY FOR C-MOUNT CAMERA

BACKGROUND OF THE INVENTION

1. Field of the Invention

The present invention relates to a color separation prism assembly which can be used in a C mount type color TV camera.

2. Description of the Related Art

In general, a conventional three tube or chip type color TV camera includes a color separation prism assembly provided behind a photographing lens which separates light incident thereupon from the photographing lens into three primary colors: blue, red and green. An image pickup tube or a CCD is provided on an image forming surface for each color image.

A large color TV camera having a flange back of 48 mm or 58 mm (conversion spatial distance, or reduced distance), for commercial use in a TV station, and a small C mount type color TV camera having a length of 17.526 mm (conversion spatial distance, or reduced distance) derived from a 16 mm camera, are known. A C mount type CCTV camera is usually used in a surveillance system.

In a large camera having a long length, there is sufficient space to accommodate a large color separation prism assembly behind the photographing lens. Hence, a high resolution and a faithful color reproduction can be relatively easily obtained by the color separation prism assembly. However, in a small C mount type color TV camera having a short length, it is difficult to arrange therein a large color separation prism assembly. Thus there has been a need to develop a color separation prism assembly for a C mount type color TV camera in order to obtain a high resolution and a faithful color reproduction.

SUMMARY OF THE INVENTION

It is an object of the present invention to provide a color separation prism assembly which can be used in a C mount type color TV camera.

To achieve the object, according to the present invention, there is provided a color separation prism assembly having an imaging lens, a blue light separation prism, a red light separation prism, and a green light transmission prism, arranged in this order behind the imaging lens. A blue light reflecting dichroic layer is located between the blue light separation prism and the red light separation prism. A red light reflecting dichroic layer is located between the red light separation prism and the green light transmission prism. The color separation prism assembly satisfies the following relationships:

$$20° < \alpha < 22° \quad (1)$$

$$35° < \beta < 37° \quad (2)$$

wherein $\alpha$ represents the angle defined between a light incident surface of the blue light separation prism, perpendicular to an optical axis of the imaging lens, and the blue light reflecting dichroic layer, and $\beta$ represents the angle defined between a light incident surface of the red light separation prism, parallel to the blue light reflecting dichroic layer, and the red light reflecting dichroic layer.

These angles $\alpha$ and $\beta$ make the color separation prism assembly small and thin.

Preferably, the prisms are all made of a material whose refractive index n is larger than 1.7 (n>1.7). If the refractive index n is larger than 1.7, the prisms can be accommodated within the length of the C mount.

The present disclosure relates to subject matter contained in Japanese Patent Application No. 7-147586 (filed on Jun. 14, 1995) and Japanese Patent Application No. 8-5860 (filed on Jan. 17, 1996) which are expressly incorporated herein by reference in their entirety.

BRIEF DESCRIPTION OF THE DRAWING

The present invention will be described below with reference to the accompanying drawing of which FIG. 1 schematically shows a C mount type color TV camera having a color separation prism assembly by way of example, according to the present invention.

DESCRIPTION OF THE PREFERRED EMBODIMENT

Figure 1:
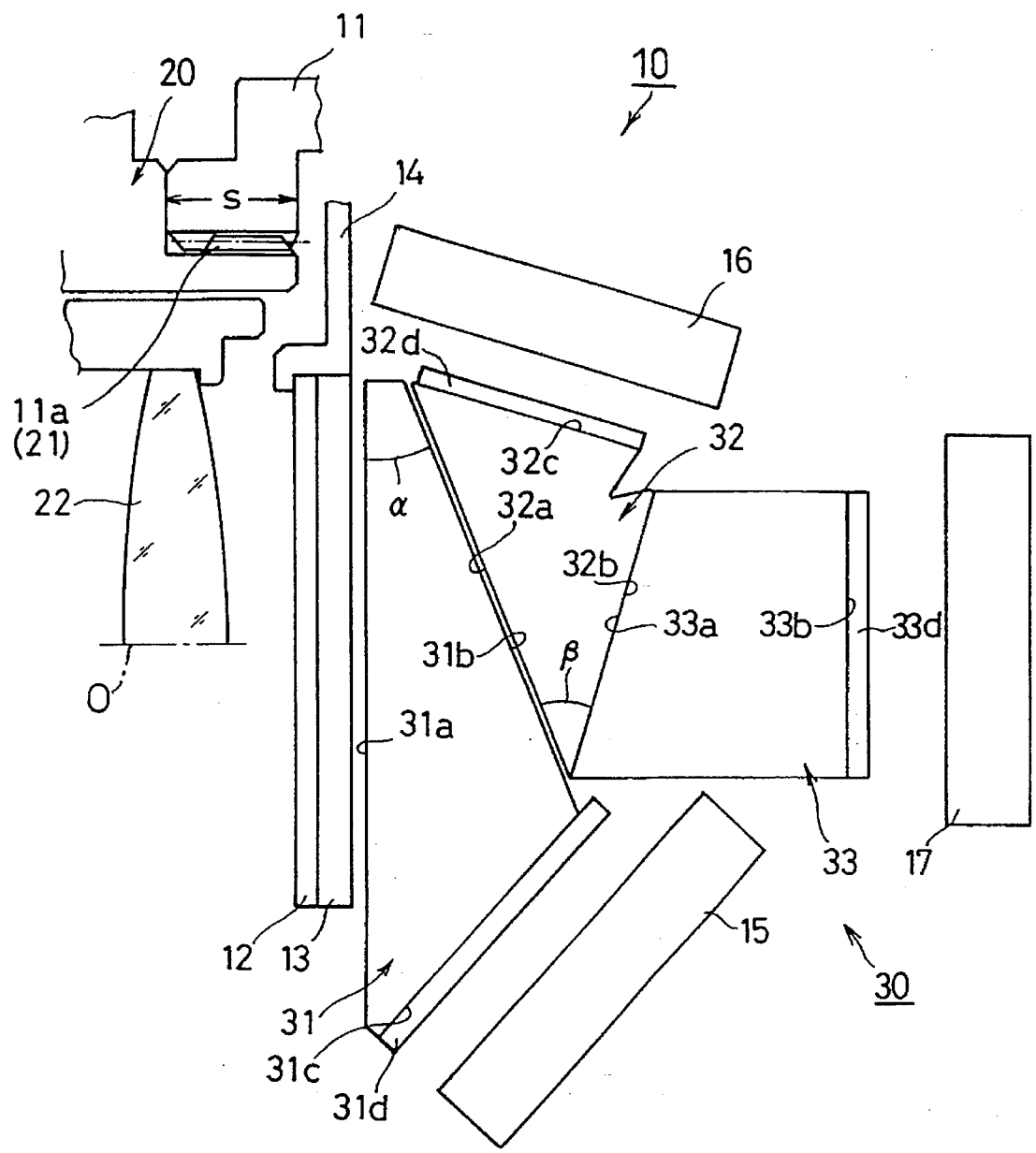

FIG. 1 shows a C mount type color TV camera 10 having a color separation prism assembly 30 according to the present invention. The C mount type color TV camera 10 is provided with a C mount 11, which is engaged by a lens mount 20. The lens mount 20 is provided with a threaded portion 21 engages with a threaded portion 11a of the C mount 11, and holds a photographing lens 22. A holder 14 holds a low-pass filter 12 and an infrared cutting filter 13 which cuts infrared radiation. The color separation prism assembly 30 is provided behind the low-pass filter 12 and the infrared cutting filter 13. The color separation prism assembly 30 separates light converged by the photographing lens 22 into three color components, i.e., blue, red and green light components. The three color components are respectively incident upon a blue CCD 15, a red CCD 16 and a green CCD 17.

The color separation prism assembly 30 consists of a blue light separation prism 31, a red light separation prism 32 and a green light transmission prism 33 in this order from the infrared cutting filter 13. The blue light separation prism 31 and the red light separation prism 32 are slightly spaced apart. The red light separation prism 32 is cemented to the green light transmission prism 33.

The blue light separation prism 31 consists of a light incident surface 31a perpendicular to an optical axis O of the photographing lens 22, a blue light reflecting dichroic layer 31b and a blue light emission surface 31c.

The red light separation prism 32 includes a light incident surface 32a, which is parallel with the blue light reflecting dichroic layer 31b, a connecting surface which connects the red light separation prism 32 with the green light transmission prism 33, and a red light emission surface 32c. The connecting surface is provided with a red light reflecting dichroic layer 32b.

The green light transmission prism 33 consists of a light incident surface 33a; parallel with the red light reflecting dichroic layer 32b; and a green light emission surface 33b perpendicular to the optical axis O of the photographing lens 22.

Light transmitted through the photographing lens 22 is incident upon the light incident surface 31a of the blue light separation prism 31. The blue light reflecting dichroic layer 31b reflects the blue light component and transmits the other light components therethrough. The reflected blue light component, is totally reflected by the light incident surface 31a before transmitting through the blue light emission surface 31c. The blue light is emitted incident upon the CCD 15 for blue light (blue CCD) through a glass filter 31d.

Light transmitted through the blue light reflecting dichroic layer 31b is incident upon the red light separation prism 32 through the light incident surface 32a thereof. The red light component is reflected by the red light reflecting dichroic layer 32b, and the other light components transmit through the red light reflecting dichroic layer 32b. The reflected red light component, is totally reflected by the light incident surface 32a before transmitting through the red light emission surface 32c. The red light emerges and is incident upon the CCD 16 for red light (red CCD) through a glass filter 32d.

The light component transmitted through the red light reflecting dichroic layer 32b, is incident upon the green light transmission prism 33 at the light incident surface 33a before transmitting through the green light emission surface 33b of the green light transmission prism 33. The green light emerges and is incident upon the CCD 17 for green light (green CCD) through a glass filter 33d. The output of the blue CCD 15, the red CCD 16 and the green CCD 17 are combined to form a color image to be viewed.

In the color separation prism assembly having the basic functions as mentioned above, the present invention is characterized by the angle (apex angle) $\alpha$, defined by the light incident surface 31a of the blue light separation prism 31 and the blue light reflecting dichroic layer 31b, and the angle (apex angle) $\beta$, defined by the light incident surface 32a of the red light separation prism 32 and the red light reflecting dichroic layer 32b. Also, the present invention is characterized by the refractive index of the material of which the blue light separation prism 31, the red light separation prism 32, and the green light transmission prism 33 are made. Namely, according to the present invention, the color separation prism assembly satisfies the following relationships:

$$20° < \alpha < 22° \quad (1)$$

$$35° < \beta < 37° \quad (2)$$

If the angles $\alpha$ and $\beta$ are below the respective lower limits, the color separation prism assembly is small and thin, but each prism must be made of a material having a high refractive index, which limits the selection of appropriate glass materials. Conversely, if the angles $\alpha$ and $\beta$ are above the respective upper limits, all the prisms 31, 32 and 33 can be made of a material having a relatively low refractive index, but it is difficult to have all the light components incident upon the corresponding CCDs. Moreover, it is difficult to arrange the color separation prism assembly within the length of the C mount. Specifically, the blue light component is reflected by the blue light reflecting dichroic layer 31b and the other light components are transmitted therethrough. If the apex angle $\alpha$ of the prism 31 is above the upper limit, even if the prism 31 is made of a glass having a high refractive index, it is difficult to transmit all the light components other than the blue light component through the blue light reflecting dichroic layer 31b without being totally reflected thereby. Furthermore, the blue light component, reflected by the blue light reflecting dichroic layer 31b, is totally reflected by the incident surface 31a to be made incident upon the blue CCD 15. If the apex angle $\alpha$ is below the lower limit, even if the prism 31 is made of a glass having a high refractive index, it is difficult to reflect the blue light component by the light incident surface 31a to thereby have the blue light component incident upon the blue CCD 15. Moreover, in view of the mechanical arrangement of the blue CCD 15, the optical path length within the prism 31 increases as the apex angle $\alpha$ increases, thus resulting in an increased possibility of interference of the CCD 15 with the prism 33.

The red light component incident upon the incident surface 32a of the red light separation prism 32 is reflected by the red light reflecting dichroic layer 32b and the other light components are transmitted therethrough and reaches the green CCD 17. The red light component reflected by the red light reflecting dichroic layer 32b is totally reflected by the incident surface 32a and reaches the red CCD 16. If the apex angle $\beta$ of the prism 32 is smaller than the lower limit, even if the prism 32 is made of a glass having a high refractive index, it is difficult to totally reflect the red light component by the incident surface 32a in order to have the red light component incident upon the CCD 16. Moreover, in view of the mechanical arrangement of the red CCD 16, the optical path length in the prism 32 increases as the apex angle $\beta$ increases, thus resulting in an increased possibility of interference of the CCD 16 with the C mount 11 (threaded portion) of the camera body or the holder 14 of the low-pass filter 12 and the infrared cutting filter 13.

It is preferable that the refractive index n of the glass material of which the blue light separation prism 31, the red light separation prism 32 and the green light transmission prism 33 are made be larger than 1.7 (i.e. n>1.7).

If the color separation prism assembly meets this requirement, the relationship defined by formulae (1) and (2) mentioned above can be easily established.

The blue light separation prism 31 whose apex angle $\beta$ was 21.0° and the red light separation prism 32 whose apex angle $\beta$ was 36.0° were experimentally obtained. In the experiment, the length of the C mount 11 of the camera body was 17.526 mm and the length of the threaded portion 11a of the C mount 11 was 3.5 mm. The holder 14 which held the low-pass filter 12 of 0.7 mm thickness and the infrared cutting filter (infrared radiation cutting filter) 13 of 1.0 mm thickness, was arranged in the camera body so as not to interfere with the threaded portion 11a. The blue light separation prism 31, the red light separation prism 32 and the green light transmission prism 33 were made of LaSFO16 (refractive index n=1.77250).

As can be understood from the above discussion, according to the present invention, a color separation (three color separation) prism assembly which can be used with a C mount type color TV camera can be obtained.

What is claimed is:

1. A color separation prism assembly, comprising:
   an imaging lens;
   a C-mount upon which said imaging lens is mounted;
   a blue light separation prism having a light incident surface perpendicular to an optical axis of said imaging lens, a red light separation prism, and a green light transmission prism, arranged in this order behind said imaging lens and said C mount;
   a blue light reflecting dichroic layer located between said blue light separation prism and said red light separation prism, and parallel to a night incident surface of said red light separation prism; and
   a red light reflecting dichroic layer located between said red light separation prism and said green light transmission prism;
   wherein said color separation prism assembly satisfies the following relationships:

$$20° < \alpha < 22°$$

$$35° < \beta < 37°$$

wherein,
   $\alpha$ represents an angle defined between said light incident surface of said blue light separation prism and said blue light reflecting dichroic layer; and
   $\beta$ represents an angle defined between a light incident surface of said red light separation prism, parallel to said blue light reflecting dichroic layer, and said red light reflecting dichroic layer.

2. The color separation prism assembly according to claim 1, wherein a refractive index of each of said blue, red, and green prisms is larger than 1.7.

* * * * *